2,855,383
VINYL ACETATE-VINYL SULFOFLUORIDE CO-POLYMERS

Otto Scherer and Karl Heinz Kahrs, Frankfurt am Main, Germany, assignors to Farbwerke Hoechst Aktiengesellschaft vormals Meister Lucius & Bruning, Frankfurt am Main, Germany, a corporation of Germany No Drawing. Application April 15, 1954
Serial No. 423,512

Claims priority, application Germany April 16, 1953

6 Claims. (Cl. 260—73)

The present invention relates to a process of preparing co-polymers and the co-polymers obtained thereby.

Vinylsulfofluoride can be obtained according to U. S. patent application Serial No. 379,477, filed on September 10, 1953, Patent No. 2,783,275, in the name of Otto Scherer and Paul Fritz Schächer, for "Vinylsulfofluoride and a Process of Preparing It" by reacting $\beta$-chloroethane-sulfofluoride or $\beta$-chloroethane-sulfochloride with alkali fluoride; it can also be prepared from ethanesulfofluoride halogenated in $\beta$-position by splitting off hydrogen halide in an aqueous suspension preferably by an alkali having a mild action.

Vinylsulfofluoride, a liquid boiling at 119° C., is relatively stable. It can, for example, be distilled with steam without decomposition.

Now, we have found that vinylsulfofluoride yields new and interesting co-polymers. As components polymerizable compounds can be used, for example, vinyl acetate, styrene, methacrylic acid ester, acrylonitrile, vinyl chloride or trifluoro-chloroethylene.

The copolymerization with vinylsulfofluoride can be carried out in substance, in aqueous emulsion, in suspension or in solution.

In the case of an emulsion polymerization attention must be paid to the fact that vinylsulfofluoride gives rise to the formation of a small amount of vinylsulfonic acid which under certain circumstances may precipitate the emulsion. It is, therefore, advisable to complete the polymerization as quickly as possible.

As catalysts there can be used all peroxide compounds, for example hydrogen peroxide, dibenzoyl peroxide, acetyl peroxide, lauroyl peroxide and the like, furthermore all persulfates, percarbonates, perborates, and, moreover, azo compounds, such as alpha, alpha'-azo-diisobutyronitrile, alpha, alpha'-azo-diisobutyramide and the like.

For the emulsion polymerization an activation by means of redox systems is especially suitable.

The use of vinylsulfofluoride as a co-polymer component improves the solubility, for example, of poly-trifluorochloroethylene and raises the softening point of polyvinyl acetate. The co-polymers of vinylsulfofluoride and vinyl acetate can be hydrolyzed in an alcoholic solution either by acids or alkalies, the $SO_2F$-group remaining to a large extent unchanged. By this reaction modified polyvinyl alcohols are obtained which can be acetalized, if desired, by simultaneously employing aldehydes in the reaction. The co-polymers obtained can be used for the production of films, threads or bodies of desired shape.

The following examples serve to illustrate the invention but they are not intended to limit it thereto, the parts being by weight:

EXAMPLE 1

*Vinylacetate/vinylsulfofluoride*

Into a three-necked flask provided with a stirrer and a reflux condenser the following solution:

200 parts of distilled water
2 parts of secondary sodium phosphate.$2H_2O$
1 part of tertiary potassium phosphate
3 parts of sodium paraffin sulfonate is introduced to which the following monomers are added:

50 parts of vinylacetate
50 parts of vinylsulfofluoride.

pH-value of the mixture about 7.

The mixture is heated to a temperature of 80° C. (bath temperature) while stirring. At this temperature, the following activating solution is added, drop by drop, by means of a dropping funnel:

50 parts of distilled water,
0.2 part of sodium bisulfite,
0.67 part of potassium persulfate, the pH value of the activating solution being about 4. After a short time, vivid polymerisation sets in which is finished after 1–1½ hours.

The emulsion obtained is precipitated by means of the solution of a salt, such as NaCl, or an electrolyte, and the precipitate is washed until free from emulsifier and dried.

Yield: 87 parts of a colourless powder which is easily soluble in acetone, ethylacetate, cyclohexanone, dioxane, while it is hardly soluble in methanol, benzene and chloroform. After a three times repeated dissolution followed by reprecipitation from acetone/water the analysis showed:

8.10, 8.30% F
14.75, 14.97% S which corresponds to an incorporation of 50% of vinyl sulfofluoride. From a solution of the product is acetone a glassclear film was obtained. The copolymer may be hydrolyzed in an alcoholic solution either by alkalies or acids whereby essentially the acetate group and not the sulfofluoride group is split off; if desired, acetylisation is effected by means of aldehydes, in a known manner.

EXAMPLE 2

*Vinylacetate/vinylsulfofluoride*

A mixture consisting of:

89 parts of vinylacetate
10 parts of vinylsulfofluoride
1 part of benzoyl peroxide is polymerized in the following manner in a 300 cc. powder flask provided with a reflux condenser:

By means of a dropping funnel on the reflux condenser 10% of the above mixture is charged and heated to 80° C. (bath temperature). After the starting of the polymerisation, the rest of the solution is added drop by drop. The introduction is finished after 2 hours. The reaction is maintained at 80° C. for a period of 16 hours. After cooling, a clear block is obtained.

Yield: 95 parts.

After a three times repeated dissolution followed by reprecipitation in acetone/water the analysis shows:

F: 2.02, 2.14% corresponding to an incorporation of 12% of vinyl sulfofluoride into polyvinyl acetate.

K-value, according to Fikentscher, measured in benzene: 50. The softening point of this block polymer is determined and found to be at 167° C. according to Krämer-Sarnow and at 168° C. according to the ring and ball method.

The softening point was found to be higher by about 20° C. than that of polyvinyl acetate alone, having an equal chain length.

EXAMPLE 3

*Styrene/vinylsulfofluoride*

In a three-necked flask provided with a stirrer and a reflux condenser 5 parts of styrene,
5 parts of vinyl sulfofluoride are emulsified in the following solution:

200 parts of water
2 parts of secondary sodium phosphate.2H$_2$O
3 parts of sodium paraffin sulfonate pH value: 6.5.

After heating to 90° C. (bath temperature) the following mixture of monomers is added drop by drop by means of a dropping funnel within a period of 1 hour:

45 parts of styrene
45 parts of vinyl sulfofluoride

Simultaneously, the following activating solution is added drop by drop by means of another dropping funnel:

50 parts of water,
0.2 part of sodium bisulfite,
0.67 part of potassium persulfate,
1 part of secondary sodium phosphate.2H$_2$O pH value: 6.5.

After 3 hours, the emulsion instantaneously becomes thick and precipitates. It is filtered off by suction and the precipitate is washed until free from emulsifier.

Yield: 76 parts of a colourless copolymer which after a three times repeated dissolution followed by reprecipitation from methylene chloride/methanol shows the following values of analysis:

F: 5.40, 5.40%
S: 11.15, 11.38% corresponding to an incorporation of 31% of vinyl sulfofluoride. The product is easily soluble in acetone, methylene chloride, benzene, ethyl acetate, cyclohexanone, dioxane, tetrahydronaphthalene.

A glass clear film could be obtained in an acetone solution of 25%. In the heat the product can be processed to solid bodies of desired shape.

EXAMPLE 4

*Methacrylic acid methyl ester/vinylsulfofluoride*

Into a three-necked flask provided with a stirrer and a reflux condenser the following solution of 200 parts of distilled water
2 parts of secondary sodium phosphate.2H$_2$O
2.5 parts of sodium paraffin sulfonate is introduced. pH value: 7.5.

After heating to 90° C. (bath temperature), the following mixture of monomers is added drop by drop by means of a dropping funnel within 1 hour:

90 parts of methyl methacrylate
10 parts of vinylsulfofluoride

Simultaneously, the following activating solution is added drop by drop by means of a second dropping funnel:

50 parts of distilled water
0.2 part of sodium bisulfite
0.67 part of potassium persulfate
1 part of secondary sodium phosphate.2H$_2$O pH value: 6.5–7.

After 2 hours, the emulsion is precipitated by means of the solution of a salt, such as NaCl, or an electrolyte, the precipitate is filtered by suction and washed until free from emulsifier.

Yield: 91 parts of a completely colourless polymer in the form of a fine powder, which after a three times repeated dissolution followed by reprecipitation from acetone/water shows the following values of analysis:

F: 1.05, 1.09%
S: 1.47, 1.61% corresponding to an introduction of 5% of vinyl sulfofluoride. The substance is easily soluble in acetone, cyclohexanone, ethyl acetate, methylene chloride, dioxane.

The substance is hardly soluble in water, methanol and benzene.

EXAMPLE 5

*Acrylonitrile/vinylsulfofluoride*

Into a three-necked flask provided with a stirrer and a reflux condenser the following solution of 250 parts of distilled water
3 parts of sodium paraffin sulfonate
50 parts of a buffer solution [1]

[1] Buffer solution:
    960 parts of distilled water
    30 parts of sodium acetate
    10 parts of glacial acetic acid is introduced. pH-value: 4.5.

After heating to 80° C. (bath temperature), 2 parts of perhydrol (35%) are added as well as the following mixture of monomers:

9 parts of acrylonitrile
1 part of vinylsulfofluoride

Furthermore, 81 parts of acrylonitrile
9 parts of vinylsulfofluoride are added drop by drop by means of a dropping funnel within 1 hour, whereas by means of a second dropping funnel a freshly prepared 1% solution of sodium formaldehyde sulfoxylate (about 50 cc.) is added. The reflux is finished after about 4 hours; heating of the mixture is continued for a further 30 minutes.

The precipitated powdery coagulant is filtered by suction and washed until free from emulsifier. Yield: 60 parts.

A part of the substance is extracted with methanol in the Soxhlet apparatus for 48 hours in order to eliminate the remaining monomers, then it is dried and analysed. The following percentages are found:

F: 0.32, 0.38%
S: 0.36, 0.40% corresponding to an incorporation of 2% of vinylsulfofluoride.

EXAMPLE 6

*Trifluoro-chloroethylene/vinylsulfofluoride*

20 parts of vinylsulfofluoride and 1 part of benzoyl peroxide are placed in an autoclave of stainless steel, then 20 parts of trifluoro chloroethylene are added under pressure. The whole is heated to 60° C. for 52 hours. Then it is allowed to cool and the autoclave is opened. 15 parts of a solid substance have been formed which are eliminated from the excessive vinylsulfofluoride by filtering off, then carefully washed with water and dried at 110° C. The analysis shows the following values:

F: 23.25%; S: 21.54% corresponding to an incorporation of 74% of vinyl sulfofluoride. The product is well soluble in ethyl acetate, acetone, methanol.

We claim:

1. A process for manufacturing a solid polymer of high softening point which comprises copolymerizing vinylsulfofluoride with vinyl acetate at about 80° C. for a period of time between about 1 and about 16 hours in the presence of a peroxide polymerization promoter and recovering the solid polymer thus produced as a product of the process.

2. A process for preparing a high softening point polymer which comprises copolymerizing vinylsulfofluoride with vinyl acetate at a temperature of about 80° C. for a period of time between about 1 to 1½ hours in the presence of a persulfate polymerization promoter and water to produce a solid polymer and recovering the solid polymer thus produced.

3. A process for preparing modified polyvinyl alcohols which comprises copolymerizing vinylsulfofluoride with vinyl acetate to produce a solid polymer thereof and thereafter hydrolyzing the solid polymer in the presence of an aldehyde.

4. A copolymer of 50 parts vinylsulfofluoride and correspondingly 50 parts vinyl acetate.

5. A copolymer of 12 parts vinylsulfofluoride and correspondingly 88 parts vinyl acetate.

6. A copolymer of from 12 to 50 parts vinylsulfofluoride and correspondingly from 88 to 50 parts vinyl acetate.

References Cited in the file of this patent

UNITED STATES PATENTS 2,653,973     Hedrick _____ Sept. 29, 1953